US012689023B2

(12) United States Patent
Lee et al.

(10) Patent No.: US 12,689,023 B2
(45) Date of Patent: Jul. 21, 2026

(54) ANODE ACTIVE MATERIAL FOR LITHIUM SECONDARY BATTERY AND LITHIUM SECONDARY BATTERY INCLUDING THE SAME

(71) Applicant: SK ON CO., LTD., Seoul (KR)

(72) Inventors: Yong Seok Lee, Daejeon (KR); Jae Ram Kim, Daejeon (KR); Sang Won Bae, Daejeon (KR); Yeon Hwa Song, Daejeon (KR); Ki Joo Eom, Daejeon (KR); Myung Ro Lee, Daejeon (KR); Jae Yeong Lee, Daejeon (KR); Hyun Joong Jang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 559 days.

(21) Appl. No.: 18/163,705

(22) Filed: Feb. 2, 2023

(65) Prior Publication Data

US 2023/0246169 A1 Aug. 3, 2023

(30) Foreign Application Priority Data

Feb. 3, 2022 (KR) ......................... 10-2022-0014107

(51) Int. Cl.
*H01M 4/36* (2006.01)
*H01M 4/02* (2006.01)
(Continued)

(52) U.S. Cl.
CPC ........... *H01M 4/364* (2013.01); *H01M 4/386* (2013.01); *H01M 4/485* (2013.01); *H01M 4/583* (2013.01);
(Continued)

(58) Field of Classification Search
CPC ...... H01M 4/364; H01M 4/386; H01M 4/485; H01M 4/583; H01M 10/052;
(Continued)

(56) References Cited

U.S. PATENT DOCUMENTS

2017/0012282 A1* 1/2017 Kondo ................. H01M 4/133
2019/0312257 A1* 10/2019 Ishiwatari ............... H01M 4/62
(Continued)

FOREIGN PATENT DOCUMENTS

CN 105960726 A 9/2016
CN 109997257 A 7/2019
(Continued)

OTHER PUBLICATIONS

Extended European Search Report on the European Patent Application No. 23154445.3 issued by the European Patent Office on Jun. 26, 2023.
Office Action for Korean Patent Application No. 10-2022-0014107 issued by the Korean Patent Office on Dec. 19, 2025.
Office Action for the Chinese Patent Application No. 202310042596.0 issued by the Chinese Patent Office on Mar. 7, 2026.

*Primary Examiner* — Nicholas A Smith
*Assistant Examiner* — Seamus Patrick Mcnulty
(74) *Attorney, Agent, or Firm* — IP & T GROUP LLP

(57) ABSTRACT
An anode active material for a lithium secondary battery according to embodiments of the present invention includes a carbon-based active material and a silicon-based active material including silicon-based active material particles having a particle size distribution in a range from 1 μm to 19 μm. A lithium secondary battery having improved life-span and rapid charge/discharge properties at room temperature is provided.

15 Claims, 2 Drawing Sheets

(51) Int. Cl.

| | |
|---|---|
| *H01M 4/38* | (2006.01) |
| *H01M 4/485* | (2010.01) |
| *H01M 4/583* | (2010.01) |
| *H01M 10/052* | (2010.01) |

(52) U.S. Cl.
CPC .... *H01M 10/052* (2013.01); *H01M 2004/021* (2013.01); *H01M 2004/027* (2013.01)

(58) Field of Classification Search
CPC ..... H01M 2004/021; H01M 2004/027; H01M 4/366; H01M 4/483; H01M 4/587; H01M 4/133; H01M 4/134; H01M 10/0525; H01M 4/362; H01M 4/0404; H01M 4/139; Y02E 60/10; C01B 32/20; C01B 33/113; C01P 2004/61

See application file for complete search history.

(56) References Cited

U.S. PATENT DOCUMENTS

| | | | |
|---|---|---|---|
| 2022/0407053 A1 | 12/2022 | Jang et al. | |
| 2023/0025959 A1* | 1/2023 | Lee ....................... | H01M 4/366 |

FOREIGN PATENT DOCUMENTS

| | | | |
|---|---|---|---|
| CN | 111952658 | A | 11/2020 |
| CN | 113169340 | A | 7/2021 |
| EP | 3764441 | A1 | 1/2021 |
| JP | 2009-245773 | A | 10/2009 |
| JP | 6238251 | B2 | 11/2017 |
| KR | 10-1591698 | B1 | 2/2016 |
| KR | 10-2018-0113187 | A | 10/2018 |
| KR | 10-2020-0090643 | A | 7/2020 |

* cited by examiner

ANODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2022-0014107 filed on Feb. 3, 2022 in the Korean Intellectual Property Office (KIPO), the entire disclosure of which is incorporated by reference herein.

BACKGROUND

1. Field

The present invention relates to an anode active material for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as an electric automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode and an anode, and an electrolyte immersing the electrode assembly. The lithium secondary battery may further include an outer case having, e.g., a pouch shape accommodating the electrode assembly and the electrolyte.

Recently, as an application range of the lithium secondary battery has been expanded, developments of a lithium secondary battery having higher capacity and power is being progressed. For example, a composite of carbon and silicon having high-capacity may be used as an anode active material.

However, the silicon-carbon composite anode active material may cause a depletion of the electrolyte and an increase of resistance to deteriorate life-span properties of the lithium secondary battery.

Thus, an anode active material having improved life-span properties may be needed. For example, Korean Registered Patent Publication No. 10-1591698 discloses an anode including an anode active material containing silicon oxide, which may not provide sufficient life-span properties.

SUMMARY

According to an aspect of the present invention, there is provided an anode active material for a lithium secondary battery having improved life-span properties.

According to an aspect of the present invention, there is provided a lithium secondary battery having improved life-span properties.

An anode active material for a lithium secondary battery includes a carbon-based active material, and a silicon-based active material including silicon-based active material particles having a particle size distribution in a range from 1 μm to 19 μm.

In some embodiments, the silicon-based active material particles may have a particle size distribution within a range from 2 μm to 16 μm.

In some embodiments, the silicon-based active material particles may not include particles having a particle size less than 1 μm or greater than 19 μm.

In some embodiments, a D50 of the silicon-based active material particles may be in a range from 5 μm to 8 μm. The D50 is defined as a particle diameter when a cumulative volume percentage corresponds to 50% in a particle size distribution based on a particle volume.

In some embodiments, a D10 of the silicon-based active material particles may be in a range from 1 μm to 4 μm, and a D90 of the silicon-based active material particles may be in a range from 8 μm to 16 μm. The D10 and the D90 are defined as particle diameters when the volume cumulative percentages correspond to 10% and 90%, respectively, in a particle size distribution based on a particle volume.

In some embodiments, the carbon-based active material may include at least one selected from the group consisting of artificial graphite, natural graphite, activated carbon, a carbon nanotube, a carbon nanowire, graphene, a carbon fiber, carbon black, graphite, a porous carbon, and a material obtained by a thermal decomposition of cryogel, xerogel or aerogel.

In some embodiments, the carbon-based active material may include carbon-based active material particles having an amorphous structure.

In some embodiments, the silicon-based active material may include at least one of a SiOx ($0 \leq x < 2$) and a silicon carbide.

In some embodiments, the silicon carbide may include a porous carbon, and silicon coated at an inside of pores in the porous carbon or on a surface of the porous carbon.

In some embodiments, the SiOx may have a specific surface area ranging from 1 m²/g to 6 m²/g.

In some embodiments, a specific surface area of the silicon carbide may be in a range from 5 m²/g to 12 m²/g.

In some embodiments, a content of the silicon-based active material may be in a range from 1 wt % to 15 wt % based on a total weight of the carbon-based active material and the silicon-based active material.

In some embodiments, silicon included in the silicon-based active material may have an amorphous structure or may have a crystallite size of 7 nm or less measured by an XRD (X-ray diffraction) analysis.

In some embodiments, the crystallite size of silicon contained in the silicon-based active material may be measured based on Equation 1:

$$L = \frac{0.9\lambda}{\beta\cos\theta} \qquad \text{[Equation 1]}$$

In Equation 1, L is the crystallite size (nm), $\lambda$ is an X-ray wavelength (nm), $\beta$ is a full width at half maximum (rad) of a peak of a (111−) plane of silicon included in the silicon-based active material, and $\theta$ is a diffraction angle (rad).

In some embodiments, silicon included in the silicon-based active material may have a peak intensity ratio defined by Equation 2 of 1.2 or less in a Raman spectrum.

$$\text{Peak intensity ratio of Raman spectrum} = I(515)/I(480) \qquad \text{[Equation 2]}$$

In Equation 2, I(515) is a peak intensity of silicon included in the silicon-based active material in a region corresponding to a wave number of 515 cm$^{-1}$ in the Raman spectrum, and I(480) is a peak intensity of silicon included in the silicon-based active material in a region corresponding to a wave number of 480 cm$^{-1}$ in the Raman spectrum.

A lithium secondary battery includes an anode including an anode active material layer that includes the anode active material for a lithium secondary battery according to the above-described embodiments, and a cathode facing the anode.

According to embodiments of the present invention, an anode active material includes a carbon-based active material and a silicon-based active material.

The silicon-based active material may include silicon-based active material particles having a particle size distribution within a predetermined range. Accordingly, the silicon-based active material may not include a micro-powder (e.g., particles having a particle size of less than 1 μm) and a macro-powder (e.g., particles having a particle size exceeding 19 μm). Thus, life-span properties during rapid charge/discharge cycles may be improved while suppressing depletion of an electrolyte and increase of interface resistance.

In some embodiments, a content of the silicon-based active material may be in a range from 1 wt % to 15 wt % based on a total weight of the anode active material (e.g., a total weight of the carbon-based active material and the silicon-based active material). Within the above content range, strength/durability of the anode active material may be improved while achieving sufficient capacity properties by the silicon-based active material.

In some embodiments, the above-described silicon-based active material may have an amorphous structure or may contain silicon having a crystallite size of 7 nm or less as measured through an X-ray diffraction (XRD) analysis. Accordingly, mechanical stability of the anode active material may be improved during a press process for a fabrication of a secondary battery or during repeated charging and discharging. Thus, the life-span properties of the lithium secondary battery may be improved.

In some embodiments, a peak intensity ratio of a Raman spectrum of silicon included in the silicon-based active material may be 1.2 or less. In the peak intensity ratio range, a ratio of the amorphous structure of silicon included in the silicon-based active material may be increased, so that structural stability of the anode active material may be improved. Thus, the life-span properties of the lithium secondary battery may be improved.

DETAILED DESCRIPTION OF THE EMBODIMENTS

Figure 1:
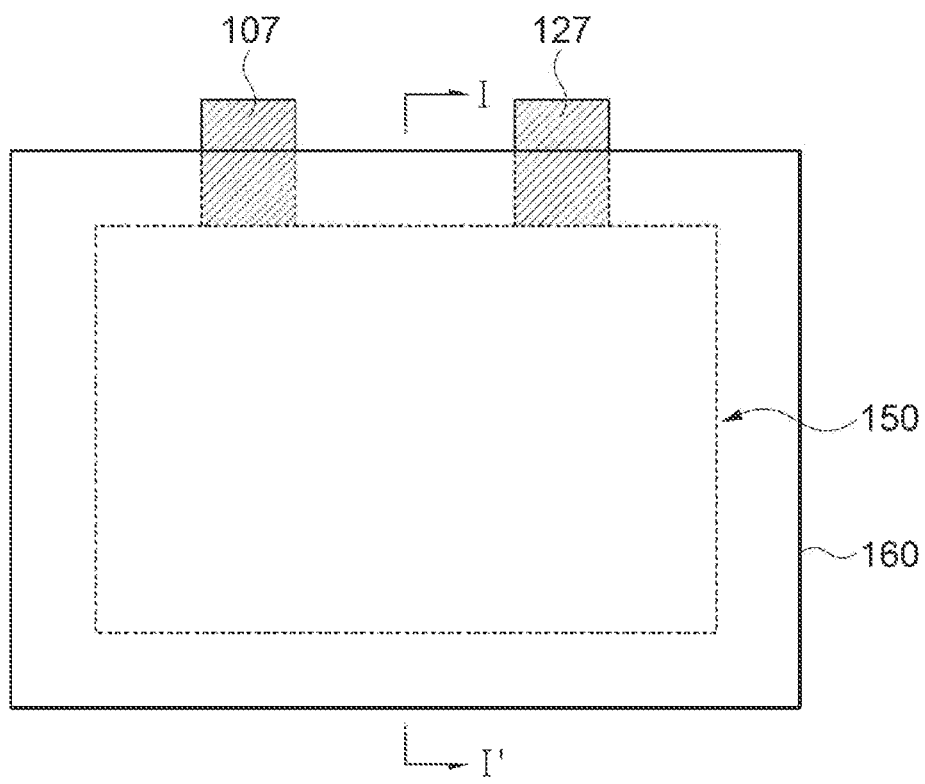
FIGS. 1 and 2 are a schematic plan view and a schematic cross-sectional view, respectively, illustrating a lithium secondary battery in accordance with exemplary embodiments.

According to embodiments of the present invention, an anode active material for a lithium secondary battery (hereinafter, that may be abbreviated as an anode active material) including a carbon-based active material and a silicon-based active material. According to embodiments of the present invention, a lithium secondary battery (hereinafter, that may be abbreviated as a secondary battery) including the anode active material is also provided.

Hereinafter, the present invention will be described in detail with reference to exemplary embodiments and the accompanying drawings. However, those skilled in the art will appreciate that such embodiments are provided to further understand the spirit of the present invention and do not limit subject matters to be protected as disclosed in the detailed description and appended claims.

The anode active material includes a carbon-based active material and a silicon-based active material.

The carbon-based active material may include at least one of, e.g., artificial graphite, natural graphite, activated carbon, a carbon nanotube, a carbon nanowire, graphene, a carbon fiber, carbon black, graphite, a porous carbon, and a material obtained by a thermal decomposition of cryogel, xerogel or aerogel.

In some embodiments, the above-described carbon-based active material may include carbon-based active material particles having an amorphous structure or a crystalline structure. Preferably, the carbon-based active material particles may have the amorphous structure. Accordingly, durability of the anode active material may be increased, and generation of cracks may be suppressed during charge/discharge or an external impact. Thus, life-span properties of the secondary battery may be improved.

In some embodiments, the carbon-based active material may include porous carbon-based particles including pores. A size of the pores may be 20 nm or less, preferably 10 nm or less. Within this range, a volume expansion of silicon included in the silicon-based active material may be alleviated or suppressed by the pores. Thus, cracks of the anode active material particles may be prevented during charging and discharging of the secondary battery to improve the life-span properties of the secondary battery.

For example, a silicon-based active material may include particles having an excessively small particle size (micro-powder). In this case, a BET specific surface area of the silicon-based active material may become increased, an SEI layer (Solid Electrolyte Interphase Layer) may be excessively formed. Accordingly, the micro-powder may cause a depletion of an electrolyte and may increase an interface resistance at room temperature, thereby deterioration of life-span/storage properties of the lithium secondary battery.

For example, a silicon-based active material may contain particles having an excessively large particle size (macro-powder). In this case, damages to other active material particles may be caused by the macro-powder in a pressing process during a fabrication of the anode. Accordingly, the life-span properties during rapid charge/discharge cycles may be deteriorated.

According to exemplary embodiments of the present invention, the silicon-based active material includes silicon-based active material particles having a particle size distribution within a range from 1 μm to 19 μm. Within the particle size distribution range, the silicon-based active material may not include the micro-powder (e.g., particles having a particle size of less than 1 μm) and the macro-powder (e.g., particles having a particle size exceeding 19 μm). Accordingly, the life-span properties during the repeated rapid charge/discharge cycles may be maintained or improved while suppressing the above-described depletion of the electrolyte and increase of the interface resistance. Additionally, the life-span/storage properties of the lithium secondary battery and the life-span properties during the rapid charge/discharge cycles may be improved.

In some embodiments, the silicon-based active material may include silicon-based active material particles having a particle size distribution within a range from 2 μm to 16 μm. For example, the silicon-based active material may not include the micro-powder having a particle size of less than 2 μm and the macro-powder having a particle size exceeding 16 μm. Accordingly, the above-described life-span/storage properties of the lithium secondary battery and the life-span properties during the rapid charge/discharge cycles may be further improved.

The term "particle size distribution" used herein may refer to a range distribution of particle sizes in which silicon-based active material particles exist in a particle size distribution (PSD) graph obtained through a particle size analyzer.

In some embodiments, the silicon-based active material particles may have a D50 in a range from 5 μm to 8 μm, a D10 in a range from 1 μm to 4 μm, and a D90 in a range from 8 μm to 16 μm. Within the D10, D50, and D90 ranges, the silicon-based active material may be prevented from including the micro-powder having a particle size of less than 1 μm and/or the macro-powder having a particle size exceeding 19 μm. Accordingly, the room temperature capacity retention of the lithium secondary battery and the capacity retention during rapid charge/discharge cycles may be improved.

The D10, D50 and D90 may be defined as particle diameters when volume cumulative percentages in the particle size distribution obtained from a particle volume correspond to 10%, 50% and 90%, respectively.

In some embodiments, the silicon-based active material may include at least one of SiOx (0≤x<2) and silicon carbide. For example, the silicon-based active material may include a silicon element, a silicon oxide (SiOx, 0<x<2), a silicon carbide, etc. These may be used alone or in a combination thereof.

In some embodiments, a specific surface area of the silicon oxide included in the silicon-based active material may be in a range from 1 m²/g to 6 m²/g. Within the specific surface area range, reduction of the capacity properties may be suppressed while reducing the formation of the SEI layer of the silicon-based active material.

In an embodiment, several types of particles having different specific surface areas may be mixed and used as the silicon oxide. For example, at least two of a first silicon oxide particle having a specific surface area from 1 m²/g to 1.6 m²/g, a second silicon oxide particle having a specific surface area from 3 m²/g to 5 m²/g, and a third silicon oxide particle having a specific surface area from 5 m²/g to 6 m²/g may be mixed and used as the silicon oxide. Accordingly, the capacity properties may be maintained/improved while preventing the electrolyte depletion.

In some embodiments, a specific surface area of the silicon carbide may be in a range from 5 m²/g to 12 m²/g. Within the specific surface area range, the formation of the SEI layer of the silicon-based active material may be suppressed while preventing the reduction of the capacity properties.

The silicon carbide may refer to a compound containing carbon and silicon. In an embodiment, the silicon carbide may include SiC.

In some embodiments, the silicon carbide may include a porous carbon and silicon coated on at least one of pores of the porous carbon or on a surface of the porous carbon. In this case, the volume expansion of the silicon-based active material may be reduced and the capacity properties of the secondary battery may be improved.

In some embodiments, a content of the silicon-based active material may be in a range from 1 weight percent (wt %) to 15 wt % based on a total weight of the anode active material (e.g., the total weight of the carbon-based active material and the silicon-based active material). Within the above content range, strength/durability of the anode active material may be improved while sufficiently achieving the capacity properties by the silicon-based active material.

In exemplary embodiments, the above-described silicon-based active material may have an amorphous structure or may contain silicon having a crystallite size of 7 nm or less as measured by an X-ray diffraction (XRD) analysis. In a preferable embodiment, the crystallite size may be 4 nm or less. Within the above range, mechanical stability of the anode active material may be improved during the press process for manufacturing the lithium secondary battery or during the repeated charging and discharging.

Accordingly, the capacity retention and the life-span properties of the lithium secondary battery may be improved.

The term "amorphous structure" as used herein refers to a case that a shape of a single silicon included in the silicon-based active material is amorphous or a case that a crystallite size is excessively small and may not be measured through a Scherrer equation represented by Equation 1 using the X-ray diffraction (XRD) analysis.

$$L = \frac{0.9\lambda}{\beta \cos\theta} \qquad \text{[Equation 1]}$$

In Equation 1 above, L represents the crystal grain size, λ represents an X-ray wavelength, β represents a full width at half maximum (FWHM) of a peak, and θ represents a diffraction angle. In exemplary embodiments, the FWHM in the XRD analysis for measuring the crystallite size may be measured from a peak of (111) plane of silicon contained in the silicon-based active material.

In some embodiments, in Equation 1 above, p may represent a FWHM obtained by correcting a value derived from an equipment. In an embodiment, Si may be used as a standard material for reflecting the equipment-derived value. In this case, the device-derived FWHM may be expressed as a function of 2θ by fitting a FWHM profile in an entire 2θ range of Si. Thereafter, a value obtained by subtracting and correcting the equipment-derived FWHM value at the corresponding 2θ from the function may be used as β.

In some embodiments, a peak intensity ratio from a Raman spectrum of silicon included in the silicon-based active material defined by Equation 2 below may be 1.2 or less. In some preferable embodiments, the peak intensity ratio may be 1.0 or less.

$$\text{Peak intensity ratio of Raman spectrum} = I(515)/I(480) \qquad \text{[Equation 2]}$$

In Equation 2, I(515) is a peak intensity of silicon included in the silicon-based active material in a region corresponding to a wave number of 515 cm⁻¹ in the Raman spectrum, and I(480) is the peak intensity of silicon included in the silicon-based active material in a region corresponding to a wave number of 480 cm⁻¹ in the Raman spectrum.

For example, I(515) in Equation 2 may represent a portion of silicon having a crystalline structure included in the silicon-based active material, and I(480) in Equation 2 may represent a portion of silicon having an amorphous structure included in the silicon-based active material.

In the peak intensity ratio range, the amorphous structure ratio of silicon included in the silicon-based active material may be increased, so that structural stability of the anode active material may be improved. Accordingly, the life-span properties of the secondary battery may be improved.

In some embodiments, the above-described crystallite size range of silicon and the peak intensity ratio range of the Raman spectrum may be both satisfied. Accordingly, the amorphous properties of the silicon-based active material may be further improved, and structural/chemical stability of the anode active material may also be improved. Thus, the life-span properties of the anode active material may be further improved.

In exemplary embodiments, the silicon-based active material may be pulverized and classified to remove the micro-powder and the macro-power. Accordingly, the silicon-based active material having a particle size distribution within a predetermined range may be obtained.

Figure 2:
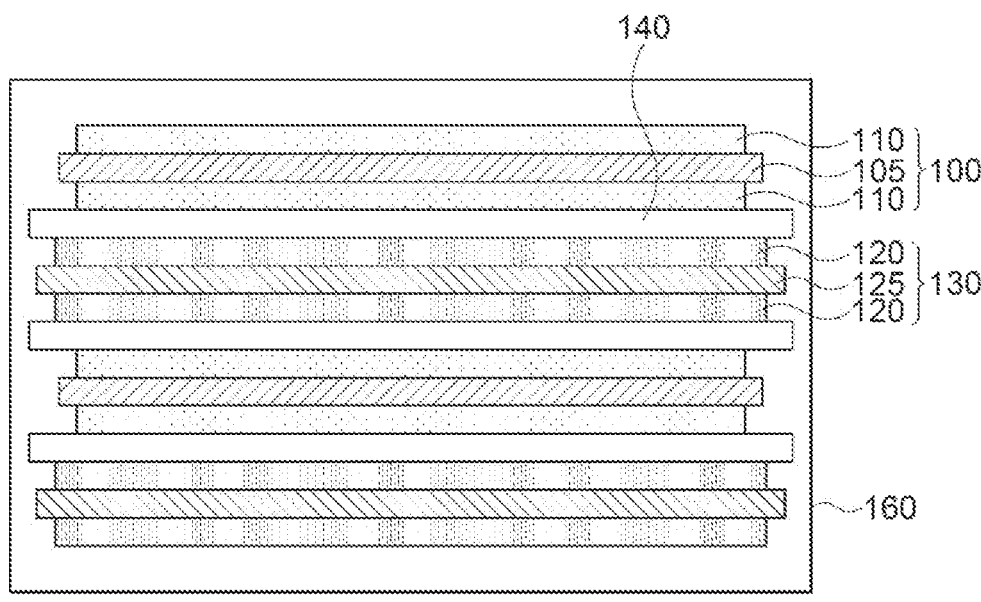

FIGS. 1 and 2 are a schematic plan view and a schematic cross-sectional view, respectively, illustrating a lithium secondary battery in accordance with exemplary embodiments.

Hereinafter, a lithium secondary battery including an anode that included an anode active material layer including the anode active material for a lithium secondary battery as described above is described with reference to FIGS. 1 and 2.

Referring to FIGS. 1 and 2 a lithium secondary battery may include an electrode assembly including an anode 130 including the above-described anode active material and a cathode 100 disposed to face the anode 130. The electrode assembly may be accommodated and impregnated with an electrolyte in a case 160.

The cathode 100 may include a cathode active material layer 110 formed by coating a mixture containing a cathode active material on at least one surface of the cathode current collector 105.

The cathode current collector 105 may include aluminum, stainless steel, nickel, titanium, or an alloy thereof, or aluminum or stainless steel surface-treated with carbon, nickel, titanium, silver, etc.

The cathode active material may include a compound capable of reversibly intercalating and de-intercalating lithium ions.

In exemplary embodiments, the cathode active material may include a lithium-transition metal oxide. For example, the lithium-transition metal oxide includes nickel (Ni) and may further include at least one of cobalt (Co) and manganese (Mn).

For example, the lithium-transition metal oxide may be represented by Chemical Formula 1 below.

$$Li_xNi_{1-y}M_yO_{2+z} \qquad \text{[Chemical Formula 1]}$$

In Chemical Formula 1, $0.9 \leq x \leq 1.2$, $0 \leq y \leq 0.7$, and $-0.1 \leq z \leq 0.1$. M may include at least one element selected from Na, Mg, Ca, Y, Ti, Hf, V, Nb, Ta, Cr, Mo, W, Mn, Co, Fe, Cu, Ag, Zn, B, Al, Ga, C, Si, Sn and Zr.

In some embodiments, a molar ratio or a concentration $(1-y)$ of Ni in Chemical Formula 1 may be greater than or equal to 0.8, and may exceed 0.8 in preferable embodiments.

A mixture may be prepared by mixing and stirring the cathode active material in a solvent with a cathode binder, a conductive material and/or a dispersive agent. The mixture may be coated on the cathode current collector 105, and then dried and pressed to form the cathode 100.

The solvent may include a non-aqueous solvent. For example, N-methyl-2-pyrrolidone (NMP), dimethylformamide, dimethylacetamide, N,N-dimethylaminopropylamine, ethylene oxide, tetrahydrofuran, etc., may be used.

The cathode binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be included to promote an electron movement between active material particles. For example, the conductive material may include a carbon-based conductive material such as graphite, carbon black, graphene, carbon nanotube, etc., and/or a metal-based conductive material such as tin, tin oxide, titanium oxide, a perovskite material such as $LaSrCoO_3$, $LaSr4MnO_3$, etc.

In exemplary embodiments, an anode slurry may be prepared from the above-described anode active material including the carbon-based active material and the silicon-based active material. For example, the anode slurry may be prepared by mixing and stirring the anode active material with an anode binder, a conductive material, and a thickener in a solvent.

For example, the solvent included in the anode slurry may be an aqueous solvent such as water, an aqueous hydrochloric acid solution, or an aqueous sodium hydroxide solution, etc.

For example, a polymer material such as styrene-butadiene rubber (SBR) may be used as the anode binder. Examples of the thickener include carboxylmethyl cellulose (CMC).

For example, the conductive material may include a material of the same type as that of the above-described conductive material included for forming the cathode active material layer.

In some embodiments, the anode 130 may include an anode active material layer 120 formed by applying (coating) the above-described anode slurry on at least one surface of an anode current collector 125 and then drying and pressing the anode slurry.

For example, the anode current collector 125 may include a metal that has high conductivity, and may be easily adhered to the anode slurry and non-reactive within a voltage range of the battery. For example, stainless steel, nickel, copper, titanium, an alloy thereof, or copper or stainless steel surface-treated with carbon, nickel, titanium or silver may be used.

A separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may be also formed from a non-woven fabric including a glass fiber with a high melting point, a polyethylene terephthalate fiber, or the like.

In some embodiments, an area and/or a volume of the anode 130 (e.g., a contact area with the separation layer 140)

may be greater than that of the cathode 100. Thus, lithium ions generated from the cathode 100 may be easily transferred to the anode 130 without loss by, e.g., precipitation or sedimentation. Thus, capacity and power of the lithium secondary battery may be improved.

In exemplary embodiments, an electrode cell may be defined by the cathode 100, the anode 130 and the separation layer 140, and a plurality of the electrode cells may be stacked to form an electrode assembly 150 having, e.g., a jelly roll shape. For example, the electrode assembly 150 may be formed by winding, laminating or folding of the separation layer 140.

The electrode assembly 150 may be accommodated together with an electrolyte in a case 160 to define a lithium secondary battery. In exemplary embodiments, a non-aqueous electrolyte may be used as the electrolyte.

For example, the non-aqueous electrolyte may include a lithium salt and an organic solvent. The lithium salt and may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, electrode tabs (a cathode tab and an anode tab) may protrude from the cathode current collector 105 and the anode electrode current collector 125 included in each electrode cell to one side of the case 160. The electrode tabs may be welded together with the one side of the case 160 to form an electrode lead (a cathode lead 107 and an anode lead 127) extending or exposed to an outside of the case 160.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

Preparation of Anode Active Material

A silicon oxide (SiOx, 0<x<2) having a particle size distribution measured from a particle size analyzer (LA 950V2, Horiba) in a range from 3 μm to 14 μm, D10 of 3.5 μm, D50 of 6.5 μm, D90 of 11.5 μm and a specific surface area of 1.5 $m^2/g$, and artificial graphite were mixed to prepare an anode active material.

A content of the silicon oxide was 10 wt % based on a total weight of the anode active material.

Fabrication of Anode

The prepared anode active material was left for one day. 95.5 wt % of the anode active material, 1 wt % of CNT as a flake type conductive material, 2 wt % of styrene-butadiene rubber (SBR) as a binder, and 1.5 wt % of carboxymethyl cellulose (CMC) as a thickener were mixed to form am anode slurry.

An anode was prepared by coating, drying and pressing the anode slurry on a copper substrate.

Fabrication of Lithium Secondary Battery $Li[Ni_{0.8}Co_{0.1}Mn_{0.1}]O_2$ as a cathode active material, carbon black as a conductive material and polyvinylidene fluoride (PVdF) as a binder were mixed in a weight ratio of 96.5:2:1.5 to from a slurry. The slurry was uniformly coated on an aluminum foil having a thickness of 12 μm, and vacuum dried to prepare a cathode for a secondary battery.

The cathode and the anode prepared as described above were each notched by a predetermined size, and stacked with a separator (polyethylene, thickness: 13 μm) interposed therebetween to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions.

An electrolyte was injected through the electrolyte injection side, and then the electrolyte injection side was also sealed. Subsequently, the above structure was impregnated for more than 12 hours.

A 1M $LiPF_6$ solution was prepared using a mixed solvent of EC/EMC/DEC (25/45/30; volume ratio), and 1 wt % of vinylene carbonate (VC), 0.5 wt % of 1,3-propenesultone (PRS) and 0.5 wt % of lithium bis(oxalato)borate (LiBOB) were added to form the electrolyte.

Thereafter, a pre-charging was performed for 36 minutes with a current corresponding to 0.25 C. Degassing was performed after 1 hour, and then aging for more than 24 hours and a formation charge/discharge were performed (charge condition CC-CV 0.2 C 4.2V 0.05 C CUT-OFF, discharge condition CC 0.2 C 2.5V CUTOFF).

Thereafter, a standard charge and discharge was performed (charge condition CC-CV 0.5 C 4.2V 0.05 C CUT-OFF, discharge condition CC 0.5 C 2.5V CUT-OFF).

[Evaluation Example 1] Evaluation on Charge and Discharge Property and Rapid Charge/Discharge Life-Span Property at Room Temperature

(1) Examples 2, 3, 5, 6 and Comparative Examples 1 to 3

An anode active material and a lithium secondary battery were prepared by the same method as that in Example 1, except that silicon oxide having a particle size distribution range, a specific surface area, particle diameters (D10, D50, D90) and a content based on the total weight of the anode active material as shown in Table 1 below was used.

(2) Example 4

An anode active material and a lithium secondary battery were prepared by the same method as that in Example 1, except that silicon carbide (SiC) having a particle size distribution range, a specific surface area, particle diameters (D10, D50, D90) and a content based on the total weight of the anode active material as shown in Table 1 was used instead of silicon oxide.

(3) Evaluation Method

1) Evaluation of Normal (Room Temperature) Charge/Discharge Life-Span

The lithium secondary batteries prepared in Examples 1 to 6 and Comparative Examples 1 to 3 were evaluated for a charge and discharge life-span property at room temperature in a range of DOD94 (SOC2-96) in a chamber maintained at 25° C. Under a constant current/constant voltage (CC/CV) condition, each battery was charged at 0.3 C to a voltage corresponding to SOC96, cut off by 0.05 C, discharged at 0.3 C to a voltage corresponding to SOC2 under a constant current (CC) condition, and then a discharge capacity was measured. After repeating the above procedure by 300 cycles, a ratio of a discharge capacity after the 300 charge/discharge cycles relative to the discharge capacity at the 1st charge/discharge cycle is shown in Table 2 below as a percentage (capacity retention).

2) Evaluation on Rapid Charge/Discharge Life-Span Property

The lithium secondary each of Examples 1-6 and Comparative Examples 1-3 was charged by C-rates of 2.0 C/1.75 C/1.5 C/1.25 C/1.0 C/0.75 C/0.5 C C-rate to reach DOD72 within 25 minutes according to a stepwise charging method, and then discharged by 1/3 C. The rapid charging evaluation was performed by repeating the charging and discharging cycle as one cycle. After repeating 100 cycles with an interphase of 10 minutes between the charge and discharge cycles, a ratio of a discharge capacity at the 100 cycles relative to a discharge capacity at the 1st cycle is shown in Table 2 as a percentage (capacity retention).

TABLE 1

| No. | particle size distribution range of silicon-based active material (μm) | specific surface area of silicon-based active material (m²/g) | particle diameter of silicon-based active material (μm) D10 | D50 | D90 | content of silicon-based active material (wt %) |
|---|---|---|---|---|---|---|
| Example 1 | 3~14 | 1.5 | 3.5 | 6.5 | 11.5 | 10 |
| Example 2 | 1.5~17 | 4 | 2 | 7 | 15.5 | 10 |
| Example 3 | 2~15 | 7 | 2.5 | 6.5 | 13.5 | 10 |
| Example 4 | 2~14 | 4 | 2.5 | 8.5 | 12 | 10 |
| Example 5 | 2.5~11 | 3 | 3 | 6.5 | 8.5 | 0.5 |
| Example 6 | 2~15.5 | 4 | 2.5 | 7 | 14.5 | 16 |
| Comparative Example 1 | 0.5~21 | 10 | 0.8 | 10 | 19.5 | 10 |
| Comparative Example 2 | 0.3~16 | 8 | 0.6 | 6.5 | 15 | 10 |
| Comparative Example 3 | 3~20.5 | 5 | 4 | 9.5 | 19 | 10 |

TABLE 2

| No. | normal charge/discharge capacity retention (300 cycles, %) | rapid charge/discharge capacity retention (100 cycles, %) |
|---|---|---|
| Example 1 | 94.8 | 98.2 |
| Example 2 | 93.1 | 97.9 |
| Example 3 | 93.3 | 98.0 |
| Example 4 | 93.2 | 97.9 |
| Example 5 | 94.5 | 97.8 |
| Example 6 | 92.7 | 97.4 |
| Comparative Example 1 | 91.9 | 93.1 |

TABLE 2-continued

| No. | normal charge/discharge capacity retention (300 cycles, %) | rapid charge/discharge capacity retention (100 cycles, %) |
|---|---|---|
| Comparative Example 2 | 92.0 | 93.3 |
| Comparative Example 3 | 92.5 | 92.1 |

Referring to Tables 1 and 2, in the lithium secondary batteries of Examples where the silicon-based active material did not contain a micro-powder and a macro-powder, the capacity retention during the normal charge/discharge and the rapid charge/discharge were explicitly improved compared to those from the lithium secondary batteries of Comparative Examples.

Figure 3:
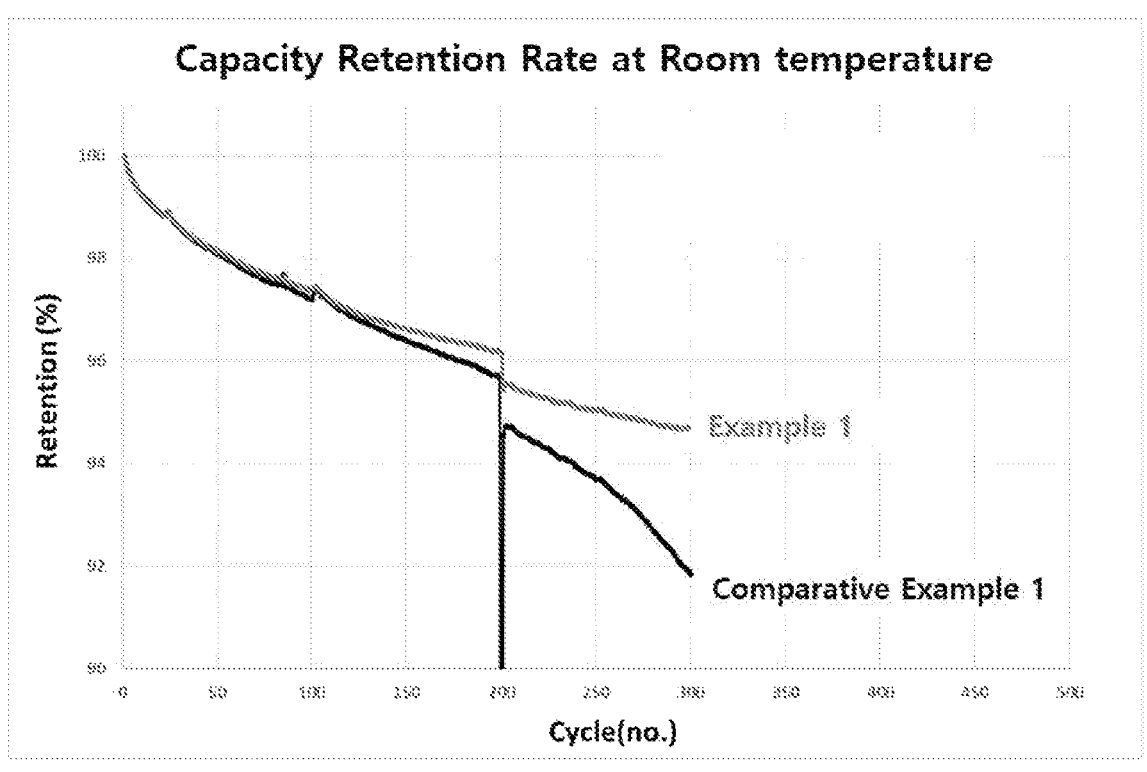
FIG. 3 is a graph showing capacity retentions at room temperature of Example 1 and Comparative Example 1.

FIG. 3 is a graph showing capacity retentions at room temperature of Example 1 and Comparative Example 1.

Referring to FIG. 3, in the lithium secondary battery of Comparative Example 1 including the micro-powder having the particle size of less than 1 μm and the macro-powder having the particle size greater than 19 μm, the capacity retentions according to repeated charging and discharging were explicitly deteriorated compared to those from the lithium secondary battery of Example 1.

In Example 2, the particle size distribution range was not within a range from 2 μm to 16 μm, and the life-span properties were relatively degraded.

In Example 3, the specific surface area was more than 6 m²/g, and the life-span properties were relatively degraded.

In Example 4, the average particle diameter (D50) exceeded 8 μm, and the life-span properties were relatively degraded.

In Example 5, the content of the silicon-based active material was less than 1 wt % based on the total weight of the anode active material, and the life-span properties were improved, but the capacity property was relatively degraded.

In Example 6, the content of the silicon-based active material exceeded 15 wt % based on the total weight of the anode active material, and the capacity properties were improved, but a volume expansion of silicon was increased to result in the relatively lower life-span properties.

[Evaluation Example 2] Evaluation of Initial
Discharge Capacity and Initial Capacity Efficiency (1) Examples 7 and 8

Silicon was deposited as a silicon-based active material on artificial graphite.

Specifically, a silane gas was injected into a CVD coater at a flow rate of 100 mL/min to 500 mL/min, and maintained at 600° C. or higher for about 30 minutes to 120 minutes at a heating rate of 5° C./min to 20° C./min to deposit silicon on artificial graphite.

An anode and a lithium secondary battery including the anode were prepared by the same method as that in Example 1, except for the above-described process.

Silicon-containing coating layers included in the anode active materials according to Examples 7 and 8 were formed by changing a silane gas flow rate, and heating rate, temperature and time.

(2) Evaluation Method

1) Measurement of Peak Intensity Ratio in Raman Spectrum

A Raman spectrum of silicon included in the silicon-based active material was measured using a 532 nm laser Raman spectroscopy for the anode active materials prepared according to the above-described Examples 1, 7 and 8. In the obtained Raman spectrum, a silicon peak intensity in a wavelength region of 515 cm$^{-1}$ and a silicon peak intensity in a wavelength region of 480 cm$^{-1}$ were measured. A peak intensity ratio of the Raman spectrum was calculated using the measured peak intensities based on Equation 2.

2) Measurement of Amorphous Property and Crystallite Size of Silicon

A crystallite size of silicon included in each anode active material prepared according to Examples 1, 7 and 8 was calculated using an XRD analysis and Equation 1 as described above.

The silicon particle size was excessively small and was not capable of being measured by the XRD analysis was determined as amorphous.

Specific XRD analysis equipment/conditions are shown in Table 3 below.

TABLE 3

| XRD(X-Ray Diffractometer) EMPYREAN | |
| --- | --- |
| Maker | PANalytical |
| Anode material | Cu |
| K-Alpha1 wavelength | 1.540598 Å |
| Generator voltage | 45 kV |
| Tube current | 40 mA |
| Scan Range | 10~120° |
| Scan Step Size | 0.0065° |
| Divergence slit | ¼° |
| Antiscatter slit | ½° |

3) Measurement of Initial Discharge Capacity

Charge (CC-CV 0.1 C 0.01V 0.05 C CUT-OFF) and discharge (CC 0.1 C 1.5V CUT-OFF) at room temperature (25° C.) were performed once for each lithium secondary battery manufactured according to Examples 1, 7 and 8 as described above to measure an initial discharge capacity.

4) Measurement of Initial Capacity Efficiency

Charge (CC-CV 0.1 C 0.01V 0.05 C CUT-OFF) and discharge (CC 0.1 C 1.0V CUT-OFF) at room temperature (25° C.) were performed 10 times for each lithium secondary battery manufactured according to Examples 1, 7 and 8 as described above to measure a discharge capacity.

The measured discharge capacity was converted as a percentage relative to the initial discharge capacity measured in 3) above.

The measurement results are shown in Table 4 below.

TABLE 4

| No. | crystallite size of silicon (nm) | peak intensity ratio of silicon | initial discharge capacity (mAh/g) | initial capacity efficiency (%) |
| --- | --- | --- | --- | --- |
| Example 1 | amorphous | 0.602 | 1852 | 99.4 |
| Example 7 | 7.2 | 1.175 | 1762 | 98.1 |
| Example 8 | 6.87 | 1.205 | 1793 | 98.2 |

Referring to Table 4, the lithium secondary battery according to Example 1 provided the improved capacity efficiency compared to those from the lithium secondary battery having the crystallite size of silicon exceeding 7 nm (e.g., Example 7) and the lithium secondary battery having the peak intensity ratio of silicon in the Raman spectrum exceeding 1.2 (e.g., Example 8).

What is claimed is:

1. An anode active material for a lithium secondary battery, comprising:

a carbon-based active material; and a silicon-based active material including silicon-based active material particles having a particle size distribution in a range from 1 μm to 19 μm, wherein silicon included in the silicon-based active material has a peak intensity ratio defined by Equation 2 of 1.2 or less in a Raman spectrum, $$\text{Peak intensity ratio} = I(515)/I(480), \qquad \text{[Equation 2]}$$

Wherein I(515) is a peak intensity of silicon included in the silicon-based active material in a region corresponding to a wave number of 515 cm$^{-1}$ in the Raman spectrum, and I(480) is a peak intensity of silicon included in the silicon-based active material in a region corresponding to a wave number of 480 cm$^{-1}$ in the Raman spectrum.

2. The anode active material for a lithium secondary battery according to claim 1, wherein the silicon-based active material particles have a particle size distribution within a range from 2 μm to 16 μm.

3. The anode active material for a lithium secondary battery according to claim 1, wherein the silicon-based active material particles do not include particles having a particle size less than 1 μm or greater than 19 μm.

4. The anode active material for a lithium secondary battery according to claim 1, wherein a D50 of the silicon-based active material particles is in a range from 5 μm to 8 μm, wherein the D50 is defined as a particle diameter when a cumulative volume percentage corresponds to 50% in a particle size distribution based on a particle volume.

5. The anode active material for a lithium secondary battery according to claim 1, wherein a D10 of the silicon-based active material particles is in a range from 1 μm to 4 μm, and a D90 of the silicon-based active material particles is in a range from 8 μm to 16 μm, wherein the D10 and the D90 are defined as particle diameters when the volume cumulative percentages correspond to 10% and 90%, respectively, in a particle size distribution based on a particle volume.

6. The anode active material for a lithium secondary battery according to claim 1, wherein the carbon-based active material includes at least one selected from the group consisting of artificial graphite, natural graphite, activated carbon, a carbon nanotube, a carbon nanowire, graphene, a carbon fiber, carbon black, graphite, a porous carbon, and a material obtained by a thermal decomposition of cryogel, xerogel or aerogel.

7. The anode active material for a lithium secondary battery according to claim 1, wherein the carbon-based active material includes carbon-based active material particles having an amorphous structure.

8. The anode active material for a lithium secondary battery according to claim 1, wherein the silicon-based active material includes at least one of a SiOx (0≤x<2) and a silicon carbide.

9. The anode active material for a lithium secondary battery according to 8, wherein the silicon carbide includes a porous carbon, and silicon coated at an inside of pores in the porous carbon or on a surface of the porous carbon.

10. The anode active material for a lithium secondary battery according to claim 8, wherein the SiOx has a specific surface area ranging from 1 m²/g to 6 m²/g.

11. The anode active material for a lithium secondary battery according to claim 8, wherein a specific surface area of the silicon carbide is in a range from 5 m²/g to 12 m²/g.

12. The anode active material for a lithium secondary battery according to claim 1, wherein a content of the silicon-based active material is in a range from 1 wt % to 15 wt % based on a total weight of the carbon-based active material and the silicon-based active material.

13. The anode active material for a lithium secondary battery according to claim 1, wherein silicon included in the silicon-based active material has an amorphous structure or has a crystallite size of 7 nm or less measured by an XRD (X-ray diffraction) analysis.

14. The anode active material for a lithium secondary battery according to claim 13, wherein the crystallite size of silicon contained in the silicon-based active material is measured based on Equation 1:

$$L = \frac{0.9\lambda}{\beta\cos\theta} \qquad \text{[Equation 1]}$$

wherein, in Equation 1, L is the crystallite size (nm), $\lambda$ is an X-ray wavelength (nm), $\beta$ is a full width at half maximum (rad) of a peak of a (111) plane of silicon included in the silicon-based active material, and $\theta$ is a diffraction angle (rad).

15. A lithium secondary battery, comprising
an anode comprising an anode active material layer that includes the anode active material for a lithium secondary battery of claim 1; and
a cathode facing the anode.

\* \* \* \* \*